Patented May 14, 1935

2,001,014

UNITED STATES PATENT OFFICE 2,001,014

PROCESS OF PREPARING ORTHO-DIHYDROXY COMPOUNDS OF THE BENZENE SERIES

Frederick B. Downing, Carneys Point, N. J., Richard G. Clarkson, Wilmington, Del., and Harry H. Reynolds, Pennsgrove, N. J., assignors to E. I. du Pont de Nemours & Company, Wilmington, Del., a corporation of Delaware No Drawing. Application September 10, 1932, Serial No. 632,630

24 Claims. (Cl. 260—154)

This invention relates to poly-hydroxy aromatic compounds, more particularly o-dihydroxy compounds of the benzene series, and processes for the manufacture thereof.

It is known that o-dihydroxy-benzene may be conveniently prepared by the hydrolysis of guaiacol with hydrobromic or hydriodic acids. An alternative method is the oxidation of salicylaldehyde. Both of these methods are unsuitable for large scale manufacturing operations because of corrosion difficulties and because of the high cost and limited quantity of the starting materials available.

Various other procedures for the synthesis of o-dihydroxy-benzene have been proposed but, in general, these processes have been attended by such difficulties as high corrosion, relatively low yields, and the fact that two or more distinct chemical steps are required, all of which add to the cost of production and leave much to be desired.

It is an object of the present invention to provide a new and improved process for the manufacture of o-dihydroxy compounds of the benzene series. A further and more specific object is the provision of a new and improved process for the production of o-dihydroxy-benzene. Another object is the provision of a practical, economical process for the production of o-dihydroxy-benzene by a reaction which proceeds smoothly and quickly without undesirable side reactions. A still further object is the production of o-dihydroxy-benzene commercially by a direct or single-step process, instead of in two or more distinct steps. An additional object is the provision of a process for producing o-dihydroxy-benzene in higher yields than heretofore obtainable commercially. Other objects will appear hereinafter.

These objects are accomplished according to the border aspects of the invention whereby o-dihydroxy compounds of the benzene series are produced by hydrolyzing o-dihalogen compounds of the benzene series at relatively high temperatures in the presence of water, hydroxyl ions, and barium or strontium ions, and preferably in the presence of a catalyst.

While the invention is susceptible of considerable variations and modification in the manner of its practical application particularly as regards the proportions of materials, temperatures, pressures and exact method of procedure, the following examples in which the parts are by weight will illustrate how it may be practiced.

Example I

Fourteen and seven-tenths parts of o-dichlorobenzene, 63 parts of barium-hydroxide-octahydrate and 108 parts of water together with one-tenth part of cuprous oxide catalyst were charged into a multiple autoclave constructed of steel being of such size that it was approximately three-quarters full. The autoclave was then heated in an oil bath maintained at a temperature of about 250° C. The autogenous pressure developed by the reaction was about 450 to 550 pounds per square inch. After about 20 hours the autoclave was cooled, opened and the contents washed out with water into a suitable receiver. The mixture of water solution and suspended barium salt of o-dihydroxy-benzene was made acid to Congo red paper with a 20% solution of hydrochloric acid and the liquid heated gently for a few minutes. The solution was filtered to remove any undissolved solids and then extracted with ether. The extract was evaporated to a small volume and dried in vacuo for a period of 12 to 14 hours at about 60° C. The residue was o-dihydroxy benzene of 97.5% purity. At the temperature employed the yield was about 17%. The reaction product also contained a relatively large amount of unconverted o-dichloro-benzene which was lost in vacuum drying.

Example II

Sixty three parts of barium hydroxide octahydrate, 14.7 parts of o-dichloro-benzene, 108 parts of water and one-tenth part of cuprous oxide catalyst were charged into an autoclave of the type described in Example I and heated to a temperature of about 275° C. for a period of ten hours, the pressure developed being about 850 to 950 pounds per square inch. At the end of this time the autoclave was cooled and the contents removed by washing into a receiver with water. The mixture of water solution and suspended salt of o-dihydroxy-benzene was made acid to Congo red paper with a solution of 20% hydrochloric acid and the resultant liquid heated gently for a few minutes. The solution was filtered to remove any undissolved solids and then extracted with ether. The extract was evaporated as described in Example I to produce a residue containing o-dihydroxy-benzene of about 97.5% purity. The yield obtained in this case was about 57%. It was noted, furthermore, that practically no o-dichloro-benzene remained in the reaction product.

*Example III*

Into a multiple autoclave of the type described in Example I, there were charged 14.7 parts of o-dichloro-benzene, 63 parts of barium hydroxide-octahydrate, 108 parts of water and one-tenth part of cuprous oxide catalyst. The autoclave was heated to a temperature of 285° C. for one hour. The autogenous pressure developed being about 1000 to 1150 pounds per square inch. At the end of this time the autoclave was cooled and the contents recovered as described in Example I. The product was o-dihydroxy-benzene of about 97.5% purity. The yield obtained in this case was about 58% by weight. No o-dichloro-benzene was observed in the product.

*Example IV*

About 14.7 parts of o-dichloro-benzene, 53.1 parts of strontium hydroxide octahydrate and 108 parts of water together with 0.1 parts of cuprous oxide were charged into an autoclave of the type described in Example I and heated to a temperature of about 275° C. for ten hours. At the end of this period the autoclave was cooled, opened and the contents recovered, as described in Example I. A yield of about 53% o-dihydroxy benzene was obtained.

*Example V*

Into an autoclave of the type described in Example I there were introduced 14.7 parts of o-dichloro-benzene, 63 parts of barium hydroxide-octahydrate, about 0.1 parts of cuprous oxide and 80 parts of water (the amount of water present giving a barium hydroxide concentration corresponding to about 3.66 normal). The autoclave was heated to a temperature of about 275° C. for a period of 10 hours. At the end of this time the autoclave was cooled and the product recovered, as described in Example I. The yield of o-dihydroxy-benzene obtained was about 27.2%.

*Example VI*

Barium hydroxide-octahydrate, ortho-dichloro-benzene and water were reacted together as described in Example V, under the same condition of time and temperature and in the same proportions except that 108 parts of water were employed (corresponding to a barium hydroxide concentration of 2.93 normal). The yield of o-dihydroxy-benzene obtained in this case was about 57%.

*Example VII*

An autoclave similar to that described in Example 1 was charged with 31.5 parts of barium hydroxide-octahydrate, 7.3 parts o-dichloro-benzene, 0.05 parts of cuprous oxide and 68 parts of water (corresponding to an alkali concentration of barium-hydroxide of about 2.44 normal). The autoclave was heated to a temperature of about 275° C. for a period of 10 hours, as in Examples V and VI. At the end of the time stated the contents were washed out into a receiver with water. The mixture of water solution and salt of o-dihydroxy-benzene was then made acid to Congo red paper with a 20% solution of hydrochloric acid and the resultant liquid heated gently for a few minutes. The solution was filtered to remove any undissolved solids and then extracted with ether. The extract was evaporated to a small volume and dried in vacuo at a temperature of about 60° C. for 12 to 14 hours. The residue was o-dihydroxy-benzene of about 98% purity, the yield being about 69.7%.

*Example VIII*

Into an autoclave similar in principle to that described in Example I, there were charged 7.3 parts of o-dichloro-benzene, 31.5 parts of barium hydroxide-octahydrate, 0.05 parts of cuprous oxide and 122.5 parts of water (corresponding to a barium hydroxide concentration of about 1.47 normal). The autoclave was heated at a temperature of about 275° C. for 10 hours and thereafter cooled and the contents recovered, as described in Example VII. A yield of about 71.9% o-dihydroxy-benzene was obtained.

In the foregoing examples, the yields are based upon the o-dihydroxy-benzene obtained, which had a purity of about 97–99%. In calculating the yield percentages, the assumption was made that o-dichloro-benzene of 100% purity was used as a starting material but actually a commercial o-dichloro-benzene of about 93.5% purity was employed. Hence, calculated on the basis of 100% o-dichloro-benzene, all of the yield figures would be somewhat higher. Higher yields may be obtained by the use of o-dichloro-benzene substantially free from p-dichloro-benzene, which is the principal impurity. It will be observed that, other things being equal, the yields vary with the temperature and the alkali concentration. The following tables will illustrate the trend in yields with change in temperature and alkali concentration.

TABLE I

| Example | Temperature | Yield |
|---|---|---|
|  | °C. | Percent |
| I | 250 | 17 |
| II | 275 | 57 |
| III | 285 | 58 |

TABLE II

| Example | Concentration of Ba(OH)$_2$ | Yield |
|---|---|---|
|  |  | Percent |
| V | 3.66N | 27.2 |
| VI | 2.93N | 57.0 |
| VII | 2.44N | 69.7 |
| VIII | 1.47N | 71.9 |

While the invention has been particularly valuable in the use of o-dichloro-benzene as a starting material for the manufacture of o-dihydroxy-benzene, it is also applicable to the treatment of other o-dihalogen-benzenes, such as o-dibrom-benzene and ortho-di-iodo-benzene. In general, it is easier to effect reactions of the type herein described with bromine and iodine derivatives than with chlorine derivatives.

Substituted o-dichloro-benzenes, o-dibromo-benzenes, and o-di-iodo-benzenes, which are stable under the conditions of reaction, may likewise be converted to o-dihydroxy-benzenes in accordance with the invention. Of this class of compounds we preferably effect the reaction with o-di-halogen compounds of the following general formula:

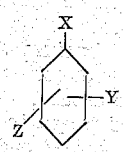

where X and Y represent chlorine, bromine, or iodine atoms and Z represents one or more substituent groups or atoms (not exceeding 4), such as alkyl ($CH_3, C_2H_5$, etc.), nitro ($NO_2$), hydroxyl, fluorine and alkoxy ($OCH_3, OC_2H_5$, and the like). In some cases, substituent groups or atoms may activate the halogens in the X and Y positions so that the reaction may proceed more easily.

The introduction of hydroxyl ions and barium or strontium ions into the reaction mixture may be effected in any suitable manner. Thus, as described in the examples, they may be introduced in the form of the barium or strontium hydroxides. Alternatively, a similar effect may be obtained by using an alkali hydroxide and a soluble barium or strontium salt which, in combination, will yield the alkaline earth hydroxide by double decomposition. As examples of compounds which may be used according to this modification of the process may be mentioned alkali metal hydroxides such as potasium, sodium and lithium hydroxides in combination with soluble barium and/or strontium salts such as, for example, the chlorides, bromides, iodides or acetates. Especially desirable results have been obtained in effecting the reaction with barium chloride and sodium hydroxide.

The amounts of reactants employed in accordance with the invention are subject to considerable variation depending largely upon the results desired. In general, it is preferable to employ at least one and one-half and not more than about four equivalents of barium or strontium per mole of o-dihalogen-benzene and in excess of two and not more than about six equivalents of hydroxyl per mole of o-dihalogen benzene. Very highly advantageous results have been obtained in the use of about two equivalents of barium and four equivalents of hydroxyl per mole of o-dihalogen benzene. Larger amounts of alkali apparently have very little effect upon the yield provided the concentration is relatively low. Larger amounts of barium or strontium tend to increase the yield but not to any considerable extent. Smaller amounts of barium or strontium may be used but this decreases the yield. Unless the amount of alkali present is sufficient to neutralize acids liberated by the reaction, the danger is incurred that the reaction mixture may become acid and corrode the equipment. Generally speaking, in the production of o-di-hydroxy-benzene in accordance with the invention, we prefer to employ about one mole of barium chloride and four moles of sodium hydroxide per mole of o-dichloro-benzene.

The amount of water present in the reaction mixture is preferably such that the alkali concentration is less than about 3.6 normal. It will be understood that by alkali concentration we mean the concentration of hydroxyl as introduced in the form of a hydroxide. It has been observed, that with solutions having an alkali concentration greater than about 3.6 normal, the yields are decreased. On the other hand, more dilute alkali concentrations give increased yields as indicated in Table II. The amount of dilution is normally limited by the size of the equipment required to make the desired quantity of o-dihydroxy-benzene. As a general rule, therefore, it is preferable to use an alkali concentration within the range of about 1.0 to 3.6 normal (that is, between 1.0 and 3.6 grams equivalents per liter of solution). Especially desirable results have been obtained from the standpoint of relatively large yields with equipment of convenient size in the use of alkali concentrations of about 2.9 normal.

In carrying out the reaction it has been observed that the presence of organic liquids such as alcohols, particularly methyl and ethyl alcohol, tend to cause the formation of ortho-chloro-phenol and reduce the yield of o-dihydroxy-benzene. It is generally desirable, therefore, to avoid the presence of such compounds in the reaction mixture. Our best results have been obtained in the use of entirely aqueous hydrolysing liquids.

The catalysts employed in accordance with the invention may be any catalyst which promotes the removal of halogen atoms, such as chlorine, bromine and iodine, from organic compounds. The catalysts may be such as are effective in carrying out the Ullmann reaction as illustrated by the following equations:

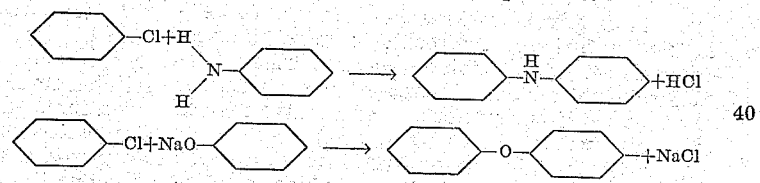

Very desirable results have been obtained in the use of cuprous oxide, preferably in proportions corresponding to about 0.5 to 2.0% by weight of o-dihalogen-benzene. If desired, larger or smaller proportions of catalyst may be used. As further examples of catalysts which are suitable for use in reactions involving removal of halogens from organic compounds may be mentioned, silver, copper, iodides and iodates of alkali metals, salts and oxides of vanadium, tungsten, molybdenum, silver, copper and the rare earth metals. The process may be effected without a catalyst but the reaction is much slower allowing more time for side reactions.

The temperature at which the reaction is effected may vary within relatively wide limits but should preferably be above about 250° C. but below the decomposition temperature, that is, below the temperature at which the reactants and/or products will decompose to a substantial extent. The temperature may vary somewhat with the catalyst employed but, in general, we have found that the results obtained have been very advantageous in the use of temperatures of about 275 to 285° C. Lower temperatures tend to prolong the reaction time to an unreasonable extent. Higher temperatures may be used, as for example 300° C., whereby the reaction is completed in a very short time. The pressures attained, however, where a closed autoclave is employed are inconveniently high.

The time required for carrying out the reaction may vary widely depending largely upon the temperature. It has been noted that the reaction proceeds very rapidly initially and great savings in time may be made by small sacrifices in yield. For example, according to the process described in Example II, a yield of 57% is obtained in ten hours while a yield of 45% may be obtained in 5 hours.

In practicing the invention, it is customary to carry out the reaction in a closed vessel so that the pressure of the reaction is the autogenous pressure of the reaction mixture at the temperature employed. The reaction is effected in this manner in order to prevent loss of the reactants as, for example, water, and to enable the reaction to proceed in liquid phase at the temperatures employed. If desired, other sources of pressure as, for example, inert gas pressure may be used.

The reaction vessel may be composed of materials of construction such as copper, iron or steel. The use of iron or steel for this purpose is apparently novel, since it would be expected that such materials of construction would inhibit the reaction. In operating the process according to the present invention we have found that after a few runs an iron or steel container is apparently coated with a thin layer of copper, from the cuprous oxide catalyst, and then functions as well as a copper-lined autoclave.

In recovering o-dihydroxy-benzene from the reaction product, any suitable procedure may be followed but that described in the examples has given very satisfactory results. In acidifying the mixture of water solution and suspended salt of o-dihydroxy-benzene, according to this procedure, any suitable acid such as, for example, sulfuric or hydrochloric may be used. In extracting the acidified solution other suitable solvents besides di-ethyl-ether such as, for example, di-isopropyl-ether and mixtures of ether and benzene may be employed.

A particular advantage of the invention is the provision of a process for the production of o-dihydroxy benzene commercially by a direct method involving a single reaction instead of two or three distinct chemical reactions as in many processes heretofore suggested. The process is further advantageous in that the yields obtained are higher than those heretofore obtainable in a process capable of being operated on a commercial scale. Another advantage of the invention lies in the fact that the reaction proceeds smoothly and without undesirable side reactions, such as the formation of large amounts of resinous products whereas, by a process such as that involving the reaction of o- or p-dichloro-benzene and sodium hydroxide at temperatures as high as 275° C. almost exclusively resinous products, insoluble in water, and only traces of dihydroxy-benzenes, (principally m-dihydroxy-benzene) are obtained.

We claim:

1. In a process of preparing o-dihydroxy compounds of the benzene series by the hydrolysis of a compound selected from the group consisting of o-dichloro-benzenes, o-dibromo-benzenes, and o-di-iodo-benzenes in the presence of water, hydroxyl ions and metal ions selected from the group consisting of barium and strontium, the step which comprises maintaining the alkali concentration of the reaction mixture below about 3.6 normal.

2. In a process of preparing o-dihydroxy compounds of the benzene series by the hydrolysis of a compound selected from the group consisting of o-dichloro-benzenes, o-dibromo-benzenes, and o-di-iodo-benzenes in the presence of water, hydroxyl ions and metal ions selected from the group consisting of barium and strontium, the step which comprises effecting the reaction under superatmospheric pressure.

3. In a process of preparing o-dihydroxy benzene by the hydrolysis of o-dichloro-benzene in the presence of water hydroxyl ions, and metal ions selected from the group consisting of barium and strontium, the step which comprises maintaining the alkali concentration of the reaction mixture below about 3.6 normal.

4. In a process of preparing o-dihydroxy benzene by the hydrolysis of o-dichloro-benzene in the presence of water, hydroxyl ions, and metal ions selected from the group consisting of barium and strontium, the step which comprises maintaining the alkali concentration of the reaction mixture within the range of 1.0 to about 3.6 normal.

5. In a process of preparing o-dihydroxy benzene by the hydrolysis of o-dichloro-benzene in the presence of water, hydroxyl ions and metal ions selected from a group consisting of barium and strontium, the step which comprises effecting the reaction at a temperature above about 250° C.

6. In a process of preparing o-dihydroxy benzene by the hydrolysis of o-dichloro-benzene in the presence of water, hydroxyl ions and metal ions selected from the group consisting of barium and strontium, the step which comprises effecting the reaction at a temperature above about 250° C. and below the decomposition temperature.

7. In a process of preparing o-dihydroxy benzene by the hydrolysis of o-dichloro-benzene in the presence of water, hydroxyl ions, metal ions selected from the group consisting of barium and strontium, and a catalyst for the reaction, the step which comprises effecting the reaction at a temperature above about 250° C. and below the decomposition temperature.

8. In a process of preparing o-dihydroxy benzene by the hydrolysis of o-dichloro-benzene in the presence of water, hydroxyl ions, metal ions selected from the group consisting of barium and strontium, and a catalyst for the reaction, the step which comprises maintaining the alkali concentration of the reaction mixture below about 3.6 normal.

9. In the production o-dihydroxy benzene by the hydrolysis of o-dichloro-benzene in the presence of water, hydroxyl ions, metal ions selected from the group consisting of barium and strontium, and a catalyst for the reaction, the process which comprises effecting the reaction with at least two equivalents of a water-soluble barium or strontium compound and in excess of two equivalents of hydroxyl per mole of o-dichloro-benzene, in an amount of water corresponding to an alkali concentration below about 3.6 normal, while maintaining the reaction temperature above about 250° C. and below the decomposition temperature.

10. In the production of o-dihydroxy benzene by the hydrolysis of o-dichloro-benzene in the presence of water, hydroxyl ions, metal ions selected from the group consisting of barium and strontium, and a catalyst for the reaction, the process which comprises effecting the reaction with about 1.5 to 4.0 equivalents of a water soluble barium or strontium compound and about 2.0 to 6.0 equivalents of hydroxyl per mole of o-dichloro-benzene, in an amount of water corresponding to an alkali concentration within the range of about 1.0 to 3.6 normal, while maintaining the reaction temperature above about 250° C. and below the decomposition temperature.

11. In the production of o-dihydroxy benzene by the hydrolysis of o-dichloro-benzene in the presence of water, hydroxyl ions, barium or strontium ions, and a catalyst selected from the group consisting of silver, copper, iodides and iodates of alkali metals, salts and oxides of vanadium, tungsten, molybdenum, silver, copper and the rare earth metals, the process which comprises effecting the reaction with about two to four equivalents of a water soluble barium or strontium compound and about two to four equivalents of hydroxyl per mole of o-dichloro-benzene, in an amount of water corresponding to an alkali concentration within the range of about 1.0 to 3.6 normal, while maintaining the reaction temperature above about 250° C. and below the decomposition temperature.

12. In the production of o-dihydroxy benzene by the hydrolysis of o-dichloro-benzene in the presence of water, hydroxyl ions, barium ions, and a small amount of a cuprous oxide catalyst, the process which comprises effecting the reaction with about two equivalents of a water soluble barium compound and about four equivalents of an alkali metal hydroxide per mole of o-dichloro-benzene, in an amount of water corresponding to an alkali concentration within the range of about 1.0 to 3.6 normal, while maintaining the reaction temperature at about 275–285° C.

13. The process of producing o-dihydroxy benzene which comprises heating together under autogenous pressure at a temperature of about 275–285° C., a mixture of o-dichloro-benzene, barium chloride, cuprous oxide, sodium hydroxide and water in proportions corresponding to about one mole of o-dichloro-benzene, one mole of barium chloride, four moles of sodium hyrdoxide, a small amount of cuprous oxide, and sufficient water to render the alkali concentration about 1.0 to 3.6 normal.

14. The process of producing o-dihydroxy benzene which comprises heating together under autogenous pressure, at a temperature of about 275–285° C., a mixture of o-dichloro-benzene, barium hydroxide, cuprous oxide and water in proportions corresponding to about 14.7 parts of o-dichloro-benzene, 63 parts of barium hydroxide, 0.07 parts of cuprous oxide and sufficient water to render the concentration of the barium hydroxide about 2.9 normal.

15. The process of producing o-dihydroxy benzene which comprises heating together under autogenous pressure, at a temperature of about 275–285° C., a mixture of o-dichloro-benzene, barium hydroxide, cuprous oxide and water in proportions corresponding to about 14.7 parts of o-dichloro-benzene, 63 parts of barium hydroxide, 0.07 parts of cuprous oxide and sufficient water to give a concentration of barium hydroxide within the range of about 1.0 to 3.6 normal.

16. In a process of preparing o-dihydroxy benzene by the hydrolysis of o-dichloro-benzene in the presence of water, hydroxyl ions and metal ions selected from the group consisting of barium and strontium, the step which comprises maintaining the reaction mixture in liquid phase with an alkali concentration of about 2.9 normal.

17. In a process of preparing o-dihydroxy benzene by the hydrolysis of o-richloro-benzene in the presence of water, hydroxyl ions and metal ions selected from the group consisting of barium and strontium, the step which comprises effecting the reaction at a temperature within the range of about 250° C. to about 300° C.

18. In a process of preparing o-dihydroxy benzene by the hydrolysis of o-dichloro-benzene in the presence of water, hydroxyl ions and metal ions selected from the group consisting of barium and strontium, the step which comprises effecting the reaction in liquid phase at a temperature of about 250° C. to about 300° C. in the presence of a cuprous oxide catalyst, while maintaining an alkali concentration below about 3.6 normal.

19. In a process of preparing o-dihydroxy compounds of the benzene series, the step which comprises hydrolyzing a compound having the following general formula:

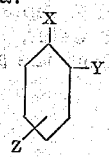

in which X and Y represent chlorine, bromine or iodine atoms, and Z represents at least one alkyl radical, with water, hydroxyl ions and metal ions selected from the group consisting of barium and strontium, while maintaining the alkali concentration of the reaction mixture below about 3.6 normal.

20. In a process of preparing o-dihydroxy compounds of the benzene series, the step which comprises hydrolyzing a compound having the following general formula:

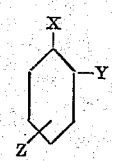

in which X and Y represent chlorine, bromine or iodine atoms, and Z represents at least one alkyl radical, with water, hydroxyl ions and metal ions selected from the group consisting of barium and strontium, under super-atmospheric pressure.

21. In a process of preparing o-dihydroxy compounds of the benzene series, the step which comprises hydrolyzing a compound having the following general formula:

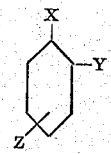

in which X and Y represent chlorine, and Z represents an alkyl radical, with water, hydroxyl ions and metal ions selected from the group consisting of barium and strontium, at a temperature from about 250° C. to about 300° C.

22. In a process of preparing o-dihydroxy compounds of the benzene series, the step which comprises hydrolyzing a compound having the following general formula:

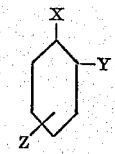

in which X and Y represent chlorine, bromine ine or iodine atoms, and Z represents at least one alkoxy radical, with water, hydroxyl ions and metal ions selected from the group consisting of barium and strontium, while maintaining the alkali concentration of the reaction mixture below about 3.6 normal.

23. In a process of preparing o-dihydroxy compounds of the benzene series, the step which comprises hydrolyzing a compound having the following general formula:

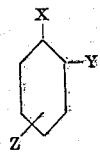

in which X and Y represent chlorine, bromine or iodine atoms, and Z represents at least one alkoxy radical, with water, hydroxyl ions and metal ions selected from the group consisting of barium and strontium, under super-atmospheric pressure.

24. In a process of preparing o-dihdroxy compounds of the benzene series, the step which comprises hydrolyzing a compound having the following general formula:

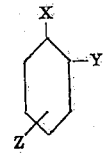

in which X and Y represent chlorine, and Z represents an alkoxy radical, with water, hydroxyl ions and metal ions selected from the group consisting of barium and strontium, at a temperature from about 250° C. to about 300° C.

FREDERICK B. DOWNING.
RICHARD G. CLARKSON.
HARRY H. REYNOLDS.